United States Patent [19]

Fossum

[11] Patent Number: 5,080,214
[45] Date of Patent: Jan. 14, 1992

[54] ELECTROMAGNETIC CLUTCH

[75] Inventor: Eric R. Fossum, Simsbury, Conn.

[73] Assignee: Inertia Dynamics, Inc., Collinsville, Conn.

[21] Appl. No.: 657,878

[22] Filed: Feb. 19, 1991

Related U.S. Application Data

[63] Continuation-in-part of Ser. No. 545,937, Jun. 29, 1990, abandoned.

[51] Int. Cl.$^5$ .............................................. F16D 27/00
[52] U.S. Cl. ................................ 192/84 R; 192/84 C; 192/84 A
[58] Field of Search .............. 192/84 R, 84 AB, 84 C, 192/84 T, 33 C, 108

[56] References Cited

U.S. PATENT DOCUMENTS

| | | | |
|---|---|---|---|
| 1,989,984 | 2/1935 | Hope | 192/84 A |
| 2,308,370 | 1/1943 | Kellett et al. | 192/84 A |
| 2,919,775 | 1/1960 | Weidmann et al. | 192/84 R |
| 2,969,134 | 1/1961 | Weidmann et al. | 192/108 X |
| 3,058,356 | 10/1962 | Welch et al. | 192/84 R X |
| 3,327,823 | 6/1967 | Miller | 192/84 C |
| 3,394,787 | 7/1968 | Fitzgerald | 192/84 A |
| 3,458,022 | 7/1969 | Reiff | 192/84 C |
| 3,650,362 | 3/1972 | Davidson | 192/84 A X |

*Primary Examiner*—Leslie A. Braun
*Assistant Examiner*—Andrea Pitts
*Attorney, Agent, or Firm*—McCormick, Paulding & Huber

[57] ABSTRACT

An electromagnetic jaw clutch has interengageable teeth with gaps between them to facilitate engaging the clutch when there is some relative rotation between these teeth. The teeth are defined on one hub and on the armature. The second hub is plastic and a spring pulls the armature toward this second hub to disengage the clutch. The spring may be integrally formed with the plastic second hub.

25 Claims, 8 Drawing Sheets

ELECTROMAGNETIC CLUTCH

CROSS REFERENCE TO RELATED APPLICATION

This application is a continuation-in-part of Ser. No. 545,937, filed June 29, 1990 now abandoned by the same applicant and bearing the same title.

BACKGROUND OF THE INVENTION

This invention relates generally to electromagnetic clutches, and deals more particularly with an electromagnetic clutch that is capable of engagement in spite of some relative rotation between the respective input and output hubs.

SUMMARY OF THE INVENTION

In accordance with the present invention an electromagnetic clutch assembly is provided with a first and a second hub, one of which hubs is rotatably supported on a shaft or a sleeve secured to the shaft. The other hub is secured to the sleeve or to the shaft. A thermoplastic bobbin has a coil wound on it, and a fixed yoke supports the bobbin so that the first hub is rotatably received inside the bobbin. An armature is rotatably received on the second hub and is moveable axially toward and away from the first hub. Biasing means in the form of an annular spring is provided between the second hub and the armature, this spring, the armature, and the second hub rotate together with one another. The spring may be formed integrally with the second hub which is fabricated from a thermoplastic material. The first hub has teeth which interact with similarly formed teeth on the armature and these teeth on both such components are provided in circumaxially spaced relationship to define generous gaps therebetween. These gaps have a circumaxial extent such that it is possible to engage these teeth even with relevant rotation between the first and second hubs.

The teeth on both the armature and on the first hub project axially toward one another and each tooth is tapered so that the engaging faces thereof have an angle with respect to the axial direction in the range of 10 to 20 degrees. The teeth may be formed from a plastic material, and more specifically may be formed in an annular ring molded in place on the respective hubs.

The annular biasing spring has oppositely projecting tangs, the biasing means may comprise a metal spring having oppositely projecting tangs, this purpose in the second hub, and the tangs on the opposite side of the spring being received in openings provided for this purpose in the armature. The biasing means may also be integrally formed with the second hub and in this case the circumaxially extending spring like portions have ends that define projections which are in turn received in openings provided for this purpose in the armature. The second hub is preferably in the form of a sprocket or spur gear formed from a thermoplastic material to facilitate relative rotation between the second hub and the sleeve.

The bobbin comprises an annular component having axially spaced radially outwardly extending flanges such that the coil can be wound therebetween. The bobbin also includes axially opposed end portions one of which is received in a central opening provided for it in the fixed yoke. The yoke has a cover which is provide with a central opening for receiving the opposite axially opposed end portion of the bobbin. The bobbin has an internal cylindrical surface that defines a bearing for a cylindrically shaped portion of the first hub. The yoke, cover, first hub, and armature are all fabricated from a paramagnetic material.

DETAILED DESCRIPTION OF FIGS. 1-13

Figure 1:
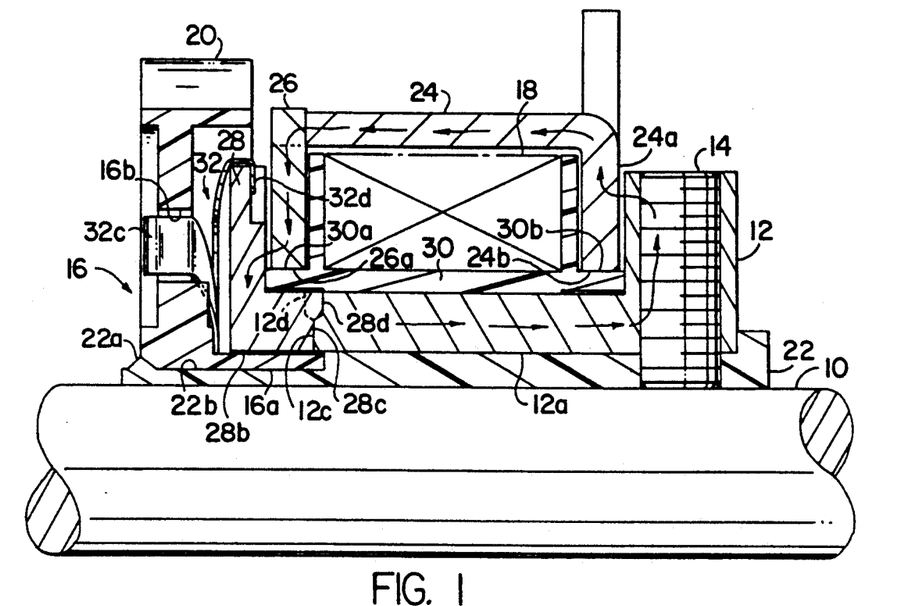
FIG. 1 is a cross sectional view through an electromagnetic clutch constructed in accordance with the present invention, and illustrates the armature and hub in engaged positions relative to one another, that is with the electrical coil being energized.

Turning now to the drawings in greater detail, FIG. 1 shows a shaft 10 which may be a drive shaft or a driven shaft, and a first hub 12 secured to the shaft 10 by a set screw 14. A second hub 16 is provided coaxially with the hub 12 and is adapted to be clutched for rotation with the first hub 12 when a coil 18 is electrically energized. The second hub 16 is in the form of a spur gear having peripheral teeth 20. The second hub 16 may be the input or output for the electromechanical clutch to be described.

The components of the electromagnetic clutch assembly are illustrated in FIGS. 4 through 13 inclusively, with the exception of sleeve 22, steel yoke 24, steel cover 26, and the thermoplastic bobbin 30. The construction of these components 22, 24, 26 and 30 can be ascertained from the assembly views of FIGS. 1 and 2.

The sleeve 22 is preferably fabricated from nylon, and has a slotted opening for receiving the set screw 14 as shown in FIG. 1. The sleeve 22 also includes an annular rib 22a which serves to retain the second hub or spur gear 16 in the axial position shown for it in FIGS. 1 and 2. More specifically, this second hub or spur gear 16 includes an inner cylindrical surface 16a which is rotatably received on an external cylindrical surface 22b of the nylon sleeve 22. Thus the spur gear 16 is free to rotate relative to the sleeve 22 secured to the shaft 10 and to the first hub 12 by the set screw 14.

Figure 2:
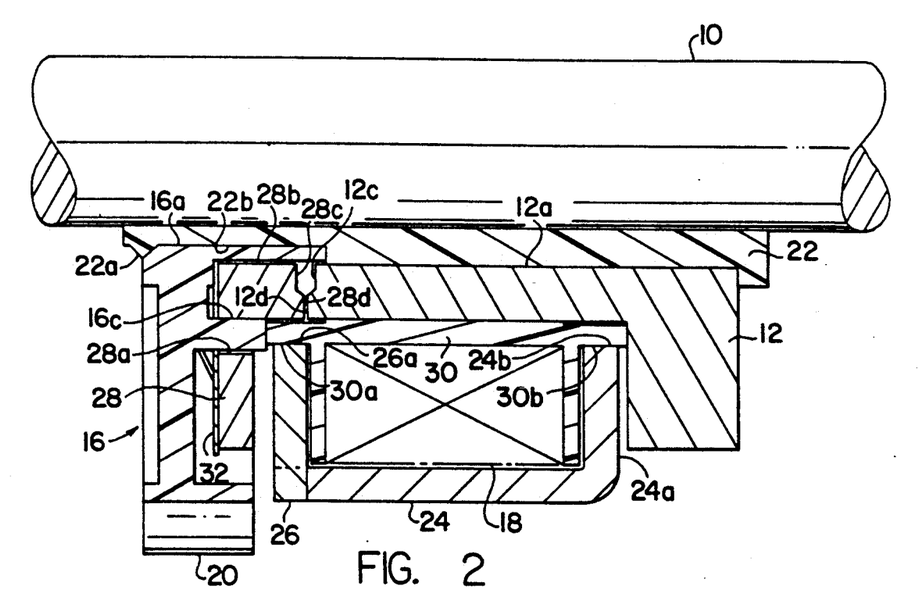
FIG. 2 is a view similar to FIG. 1 but illustrates the jaws or teeth of the armature and first hub being disengaged, that is with the coil de-energized and the annular spring having move the armature to an alternative position.

The yoke 24 comprises a generally C-shaped structure and is not annular as might be expected from a cursory inspection of FIGS. 1 and 2. This C-shaped yoke includes a center portion 24a that defines a central opening 24b and the yoke 24 serves to define an electromagnetic path for the flux generated by the coil 18 as suggested in fact by the arrows in FIG. 1. Yoke 24 as associated therewith a paramagnetic cover 26 and the cover 26 also includes a central opening 26a aligned with the opening 24b in the C-shaped yoke. The thermoplastic bobbin 30 has axially opposed end portions 30a and 30b received in these openings 26a and 24b respectively and the bobbin 30 is of annular configuration to provide a convenient means for mounting of the coil 18 in position for generating flux in the yoke and in other parts of the device to be described.

The bobbin 30 being fabricated from nylon also serves as a convenient bearing surface for the first hub 12. More specifically the first hub 12 includes an axially elongated portion 12a which is fabricated from a paramagnetic material and which cooperates with the yoke 24 and cover 26 to define an additional portion of the flux path in association with the coil 18. The end 12b of the first hub 12 defines circumaxially spaced teeth best shown in FIGS. 4, 5, 6 and 7 which cooperate with complementary shaped teeth on the adjacent end face of a steel armature 28. The armature cooperates with the axially elongated portion 12a of the hub 12 to define the final portion of the flux path generated by the coil 18 when the coil 18 is energized, moving the armature to the position shown for it in FIG. 1, and engaging the clutch teeth as a result.

Figure 8:
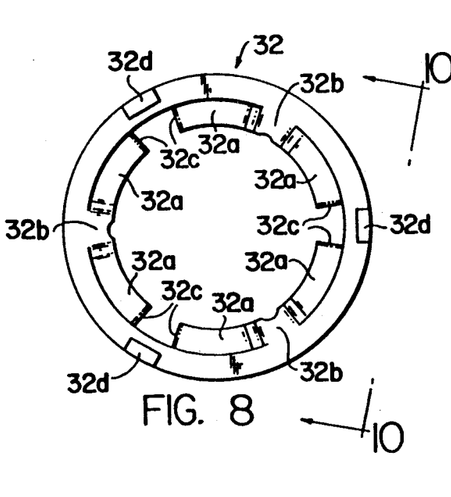
FIG. 8 is an end view of the annular spring illustrated in FIGS. 1 and 2.
Figure 9:
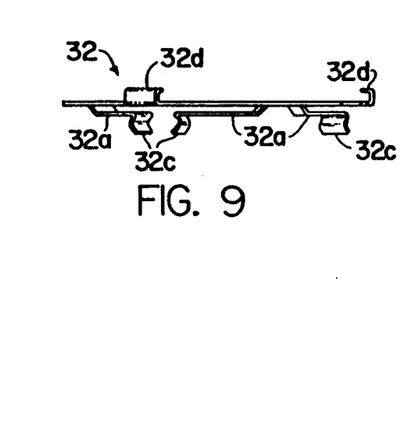
FIG. 9 is a bottom view of the FIG. 8 spring.
Figure 10:
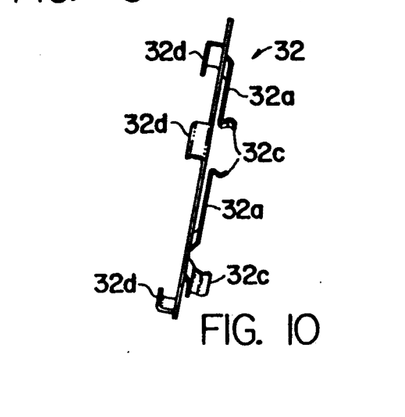
FIG. 10 is a view of the FIG. 8 spring taken generally on the line 10/10 of FIG. 8.
Figure 11:
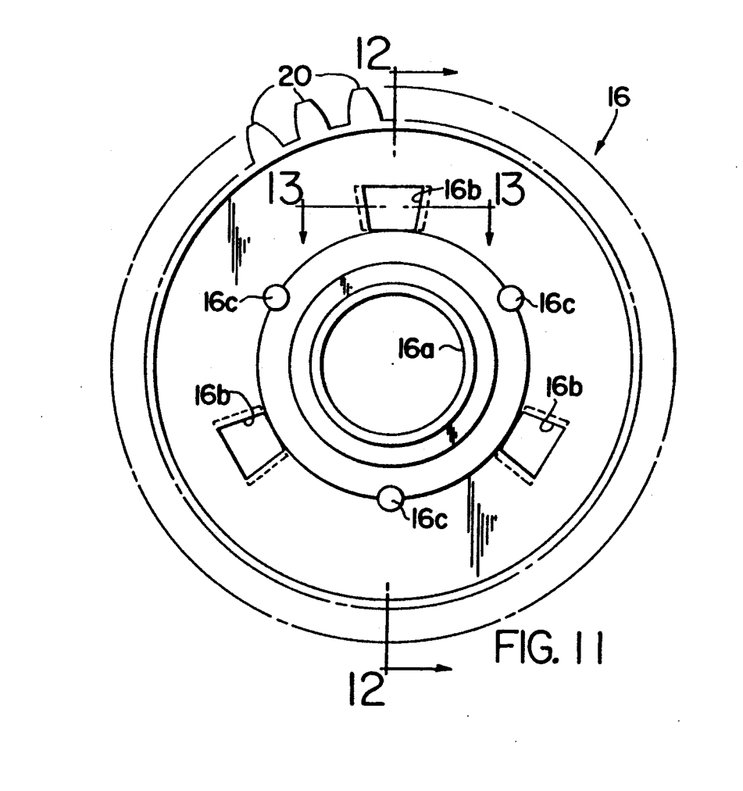
FIG. 11 is an end view of the second hub illustrated in FIGS. 1 and 2.
Figure 12:
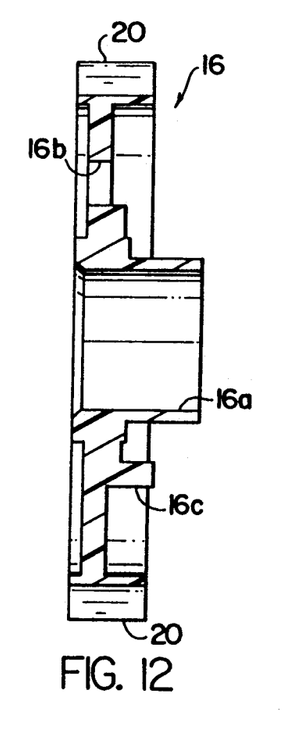
FIG. 12 is a sectional view taken generally on the line 12/12 of FIG. 11.
Figure 13:
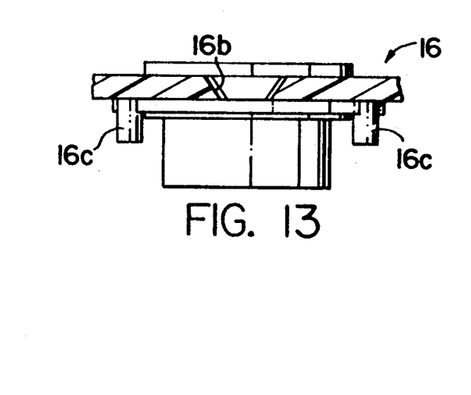
FIG. 13 is a sectional view taken generally on the line 13/13 of FIG. 11.

In order to return the armature from the position shown for it in FIG. 1 to the de-energized position illustrated in FIG. 2 biasing mean is provided between the armature and the second hub or spur gear 16. This biasing means preferably takes the form of an annular spring and is best illustrated in FIGS. 8, 9, and 10. As shown spring 32 is formed from an initially flat configuration into that illustrated in these views, and more particularly, the spring 32 has an annular outer portion as shown and also has three radially inwardly projecting portions 32b which portions 32b include circumaxially elongated fingers 32a that are integrally formed from the spring member itself but which are connected thereto only by the portions 32b. Each of these fingers 32a includes an end portion 32c, and these end portions 32c cooperate with one another to define circumaxially spaced tangs that are adapted to fit within openings provided for this purpose in the plastic spur gear 16 as best shown in FIG. 13. This opening is shown in FIG. 13 at 16b and three such openings are provided in the spur gear 16 as shown in FIG. 11. One such opening is also shown in FIG. 1, and one of the spring fingered end portion tangs 32c are also illustrated in FIG. 1.

As so constructed and arranged the spring 32 has a normal or unstressed condition as illustrated in FIG. 10 with the result that in the FIG. 1 configuration for the spring a force is exerted tending to pull armature 28 toward the spur gear 16 and more specifically into abutment therewith as illustrated in FIG. 2. The spring 32 also includes three circumaxially spaced clip portions one of which is illustrated at 32d in FIG. 8 and in FIG. 10 which clips secure the annular portion of the spring 32 to the armature 28 for movement therewith as suggested in FIG. 1.

Figure 3:
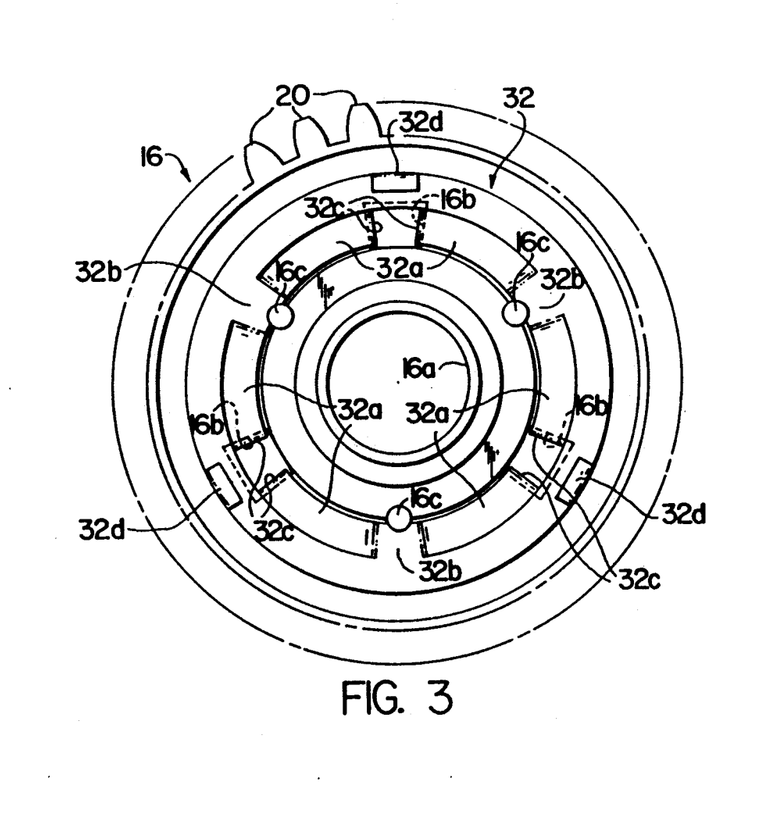
FIG. 3 is an end view of the spring and second hub of the electromagnetic clutch illustrated in FIGS. 1 and 2.

As suggested previously the spur gear 16, or second hub as it is referred to in the claims together with the armature 28 and spring 32 all move together in rotation, and the armature is adapted for limited axially movement relative to the spur gear 16 as the coil is energized and de-energized. The spur gear 16 preferably includes three circumaxially spaced studs 16c located at a radial distance from the center of rotation of the electromagnetic clutch assemble such that these studs 16c serve to locate and axially slidably support the spring 32 as suggested in FIG. 3. These studs 16c perform the same function with respect to the armature 28. Openings in the armature slidably receive these studs 16c as best shown FIG. 6 at 28a.

Figure 4:
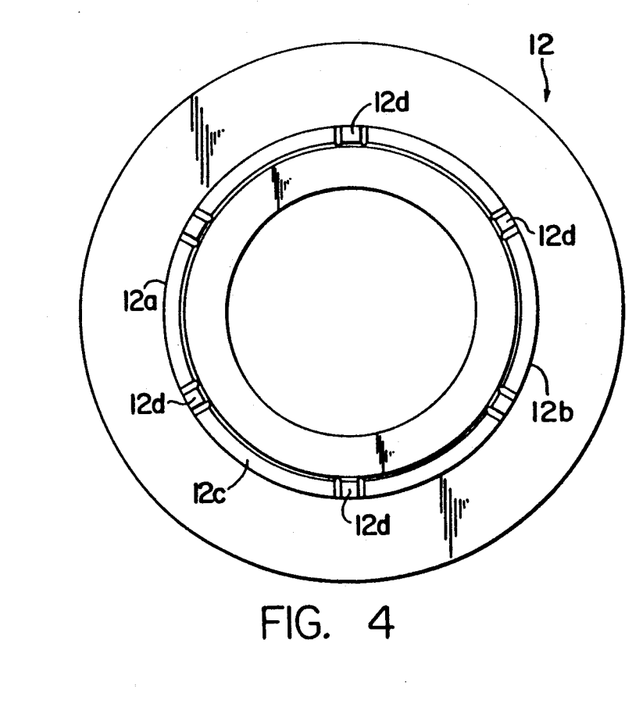
FIG. 4 is an end view of the first hub illustrated in FIGS. 1 and 2.
Figure 5:
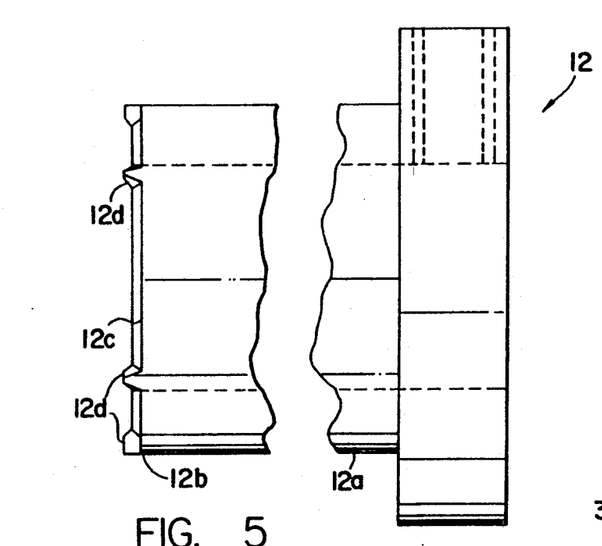
FIG. 5 is a side view of the first hub of FIG. 4.
Figure 6:
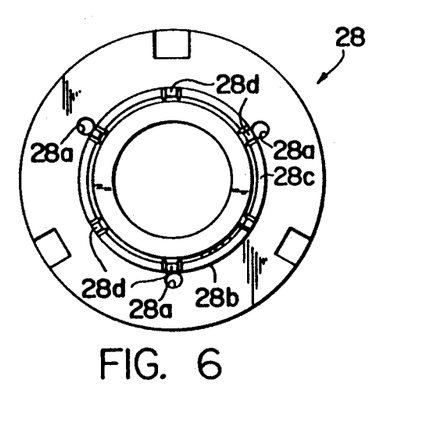
FIG. 6 is an end view of the armature illustrated in FIGS. 1 and 2 and FIG. 7 is side view thereof.
Figure 7:
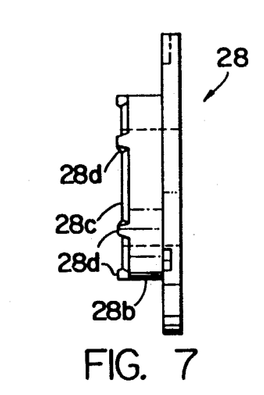

Turning next to a discussion of the armature 28 and first hub 12, as mentioned previously both of these components are fabricated from a paramagnetic material in order to define at least in part the path for the magnetic flux generated by the coil 18. FIG. 4 and FIG. 5 illustrate the hub 12 and FIGS. 6 and 7 the armature 28. Each of these components includes a generally cylindrical smaller end portion 12b and 28b respectively which portions are of substantially the same diameter both internally and externally, and which portions define mating complimentary related axially opposed end faces 12c and 28c respectively. Each of these end faces define circumaxially spaced teeth 12d and 28d which teeth are circumaxially spaced to define gaps therebetween. The gaps are of greater circumaxial extent than the circumaxial extent of said teeth. More specifically this gap between the adjacent teeth is in the range of 3 to 5 times the central angle defined by each tooth. Each tooth is preferably tapered and has an engagement face that cooperates with the tooth of the axially adjacent component. The face of each tooth forms an angle in the range of 10 to 20 degrees as defined with respect to the axial direction. It will be apparent that the teeth on the first hub project axially toward the teeth on the armature, and that the number of teeth on the armature corresponds to the number of teeth on the first hub. As so constructed and arranged the teeth are normally biased out of engagement with one another by the spring 32, and when the coil 18 is energized the armature moves toward the first hub to create an engagement situation between these teeth. As these components move toward one another the teeth of each component will first contact the gap between the teeth of the other component so as to create a situation where some relative rotation between these components can be accommodated without adversely effecting the operation of the clutch it self. This is an important feature of the present invention and is achieved as a result of the gap provided between the teeth, and as a result of the tapered tooth configuration whereby the engagement face of each tooth is oriented at an angle in the range of 10 to 20 degrees as measured with respect to the axial direction of the hub and armature.

DETAILED DESCRIPTION OF FIGS. 14-17

Figure 14:
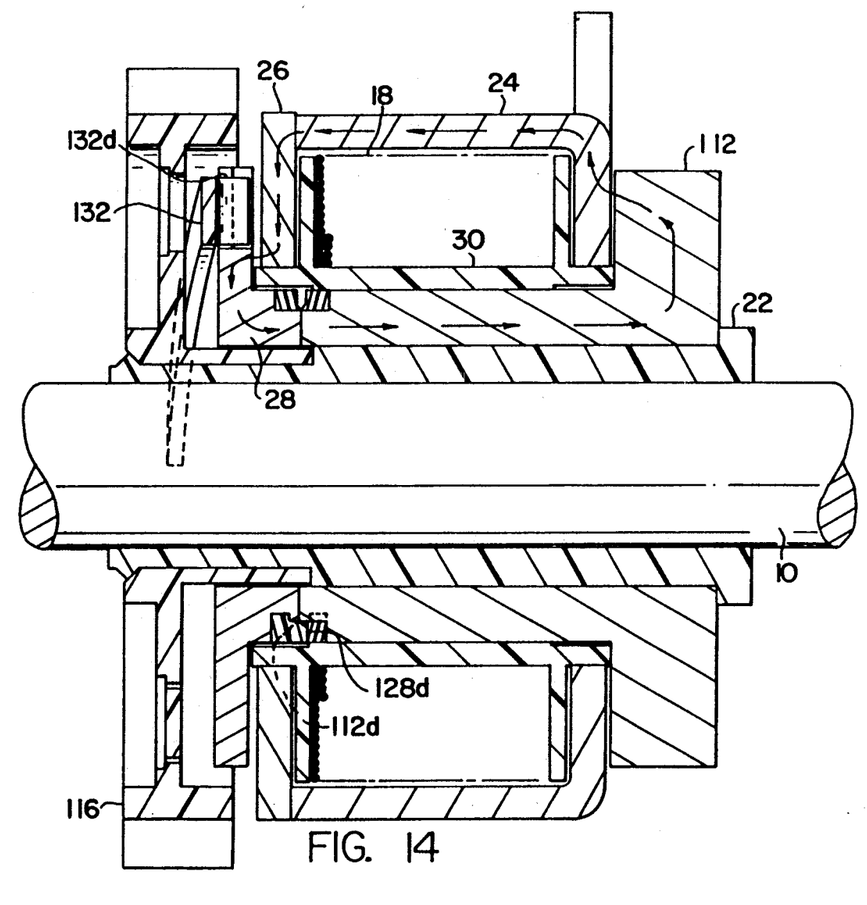
FIG. 14 is a sectional view through an electromagnetic clutch constructed in accordance with the present invention wherein the biasing means provided between the armature and the second hub is formed integrally with the latter, and illustrates the armature in its electrically energized position.
Figure 14A:
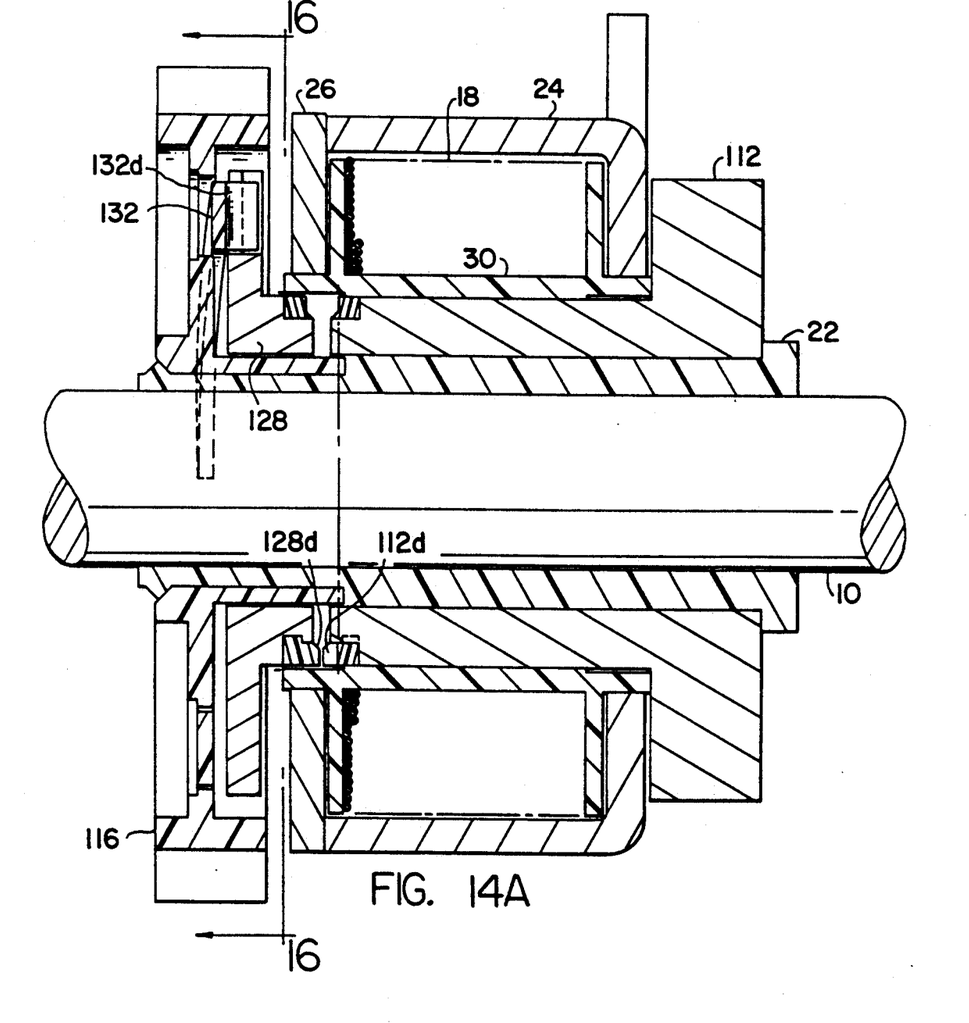
FIG. 14A is similar to FIG. 14, but shows the clutch disengaged.
Figure 15:
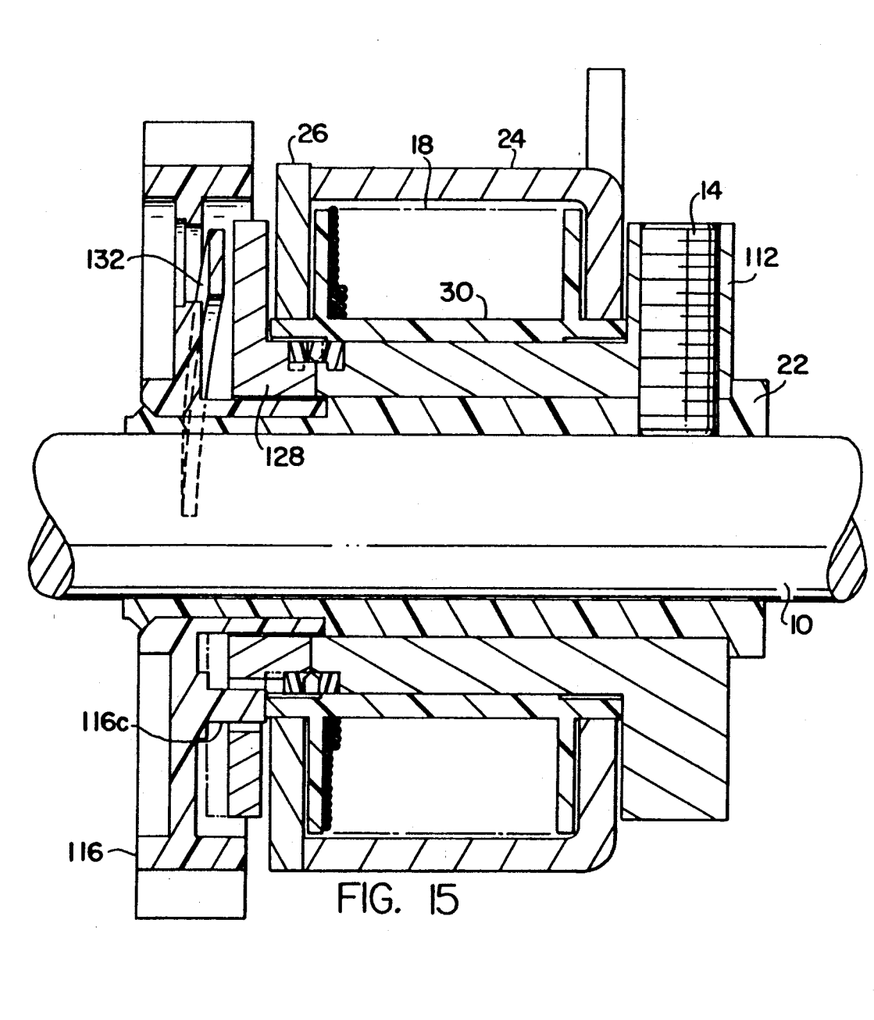
FIG. 15 is a view similar to FIG. 14, but taken on a different line as shown in FIG. 16, with the armature again being shown in its energized position.
Figure 16:
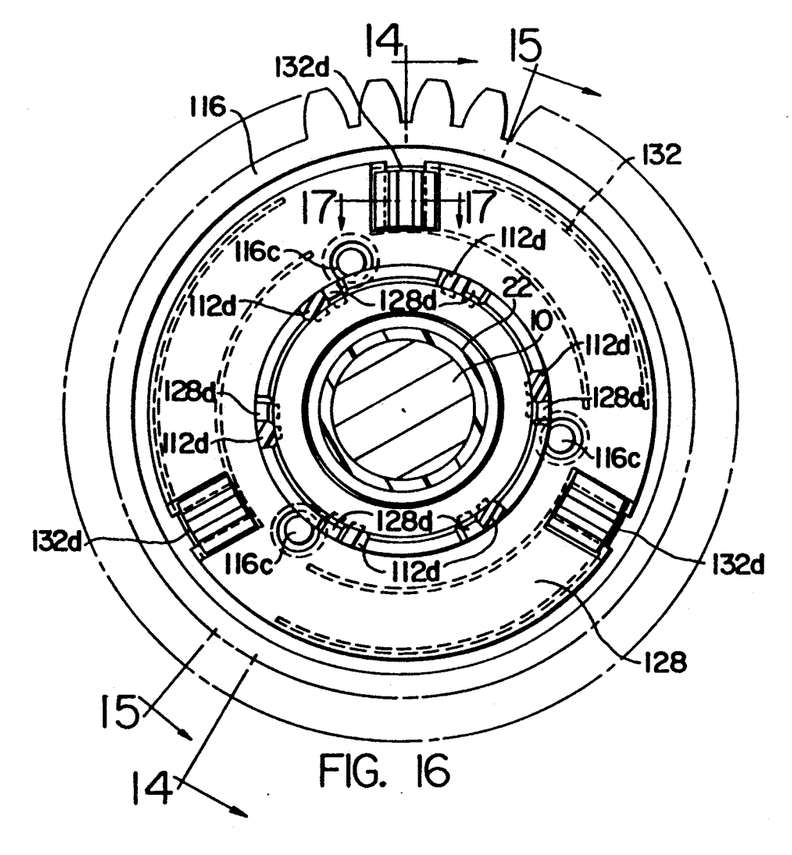
FIG. 16 is a sectional view taken on the line 16—16 of FIG. 14A, but illustrates the armature in its de-energized condition, and with the disengaged armature teeth being shown in section.
Figure 17:
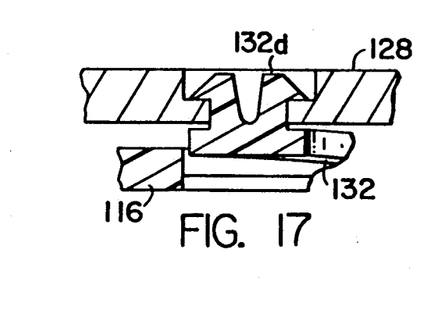
FIG. 17 is a sectional view taken generally on the line 17—17 of FIG. 16.

In the second or alternative version of the present invention spring 32 has been formed as an integral part of the second hub of the clutch which is indicated generally at 116 in FIGS. 14-16.

These views show the shaft 10 which may be a drive or driven shaft, and a first hub 112 secured to the shaft 10 by the set screw 14. The first hub 112 is generally similar to the hub 12 described previously except for the fact that the teeth 112d provided in circumaxially spaced relationship on the end of the hub 112 are not integrally formed therewith but are instead defined in a thermoplastic annular ring molded to the end of this hub 112.

As in the previously described embodiment the first hub 112 is preferably provided on a sleeve 22, which sleeve also serves to rotatably support the second hub 116 as in the first above described embodiment.

The bobbin 30 is also identical to that described previously, as is the yoke 24 and cover 26 providing the magnetic flux path as a result of energizing the coil 18 provided therebetween.

Turning now to a more detailed description of the second hub 116, it will be apparent from FIG. 15 that integrally formed circumaxially spaced posts 116c, are provided in openings defined by the armature for slidably receiving the armature for limited axial movement relative to the second hub 116. These posts also serve assure that the armature will rotate with the second hub 116.

The hub 116 also defines circumferentially extending teeth as in the previously described embodiment. In place of the steel spring of FIGS. 8-10 as utilized in the firs embodiment described above integrally formed biasing means is provided between the second hub 116 and the armature 128. Armature 128 is identical to that described previously except for the provision of thermoplastic teeth defined by an annular ring molded in place on this centered paramagnetic armature. These teeth are indicated generally at 128d.

As best shown in FIG. 14, the molded second hub 116 also defines integrally formed leaf spring elements 132, which are spaced circumaxially around the center of the hub 116 and which extend in a circumaxial direction as best shown in FIG. 16. The free end portions of these leaf spring elements 132 defines a fastener like head portions 132d which is adapted to be received in an opening provided for this purpose in the armature 112. Thus, these fastener like head portions 132d correspond closely to the projecting ears 32c in the metallic spring described above with reference to the first embodiment.

It will be apparent that the integrally formed plastic spring elements 132, are normally oriented in the same plane as the central web portion of the second hub 116 and will therefore tend to pull the armature 128 from the position shown for it in solid lines in FIG. 15 to that illustrated in phantom lines in that view. When the coil 18 is energized however the biasing force of the spring elements 132, is overcome and the armature will assume the solid line position illustrated in FIGS. 14 and 15. Thus, the integrally formed spring elements 132 comprise biasing means coupling the second hub and the armature so that they will be pulled toward one another.

Thus, the posts or studs 116c provided on the thermoplastic second hub 116 serve to couple the second hub to the armature so that these elements rotate together.

I claim:
1. An electromagnetic clutch assembly comprising a first hub, sleeve means secured to said first hub for receiving a shaft, a second hub rotatably supported on said sleeve means, a thermoplastic bobbin and a coil wound on said bobbin, a fixed yoke supporting said bobbin so that said first hub is rotatably received inside said bobbin, an armature rotatably received on said second hub and moveable axially toward and away from said first hub, biasing means provided between said second hub and said armature, means coupling said second hub and armature so that they rotate together, teeth on said first hub, and teeth on said armature, said teeth being circumaxially spaced to define gaps therebetween, said gaps being of greater circumaxial extent than the circumaxial extent of said teeth, said teeth being tapered to facilitate engagement between teeth on said first hub and teeth on said armature when there is relative rotation therebetween.

2. The clutch according to claim 1 wherein said teeth on said first hub project axially toward said teeth o said armature, and the number of teeth on said armature corresponding to the number of teeth on said first hub.

3. The clutch according to claim 1 wherein said biasing means comprises an annular spring having oppositely projecting tangs, the tangs on one side of said annular spring being received in openings provided for this purpose in the second hub and the tangs on the opposite side of said annular spring being received in openings provided in the armature.

4. The combination according to claim 1 wherein said second hub comprises a part formed from plastic and defining an internal cylindrical surface that forms a bearing with an external cylindrical surface on said sleeve means.

5. The combination according to claim 1 wherein said fixed yoke comprises a generally C-shaped component having a central opening and opposed end flanges provided radially outwardly of said bobbin and coil.

6. The combination according to claim 5 wherein said bobbin comprises an annular component having axially spaced radially outwardly extending flanges said coil being wound between said bobbin flanges, said bobbin having axially opposed end portions one of which is received in the central opening provided for it in said yoke, and said yoke further including a cover that is also provided with a central opening for receiving the other axially opposed end portion of said bobbin, said bobbin having an internal cylindrical defining a bearing surface for an external cylindrical surface provided for this purpose in said first hub.

7. The combination according to claim 6 wherein said yoke, said cover, said first hub, and said armature are all fabricated from a paramagnetic material to provide a magnetic flux path in response to an electrical current in said coil.

8. The combination according to claim 7 wherein said armature comprises an annular component having an inner portion of approximately the same radial thickness a that of said first hub, and said armature including a radially outer portion which defines said openings for receiving said tangs of said spring biasing means and said radially outer portion of said armature overlapping a portion of said paramagnetic cover.

9. The combination according to claim 8 wherein said armature is adapted for movement between an energized position where said teeth are in engagement with one another and wherein the force of said spring biasing means is overcome, and a de-energized position wherein said teeth are disengaged and wherein said spring biasing moves said armature into contact with a stop surface defined by said second hub.

10. The combination according to claim 9 wherein said teeth are equally spaced circumaxially in said armature and said hub, each tapered tooth having an engagement face inclined at an angle in a range of 10 to 20 degrees with respect to the axial direction.

11. The combination according to claim 10 wherein each of said teeth define a central angle relative to the axis of rotation (alpha), and wherein a gap between adjacent teeth is in range of 3 to 5 times alpha.

12. The combination according to claim 10 wherein said biasing means comprises an annular spring having oppositely projecting tangs, the tangs on one side of said annular spring being received in openings provided for this purpose in the second hub and tangs on the opposite side of said annular spring being received in openings provided in the armature.

13. The combination according to claim 10 wherein said second hub comprises a part formed from plastic and defining an internal cylindrical surface that forms a bearing with an external cylindrical surface on said sleeve means.

14. The combination according to claim 10 wherein said fixed yoke comprises a generally C-shaped component having a central opening and opposed end flanges provided radially outwardly of said bobbin and coil.

15. The clutch according to claim 1 wherein said biasing means comprises integrally formed leaf spring elements of said second hub, said leaf spring elements having end portions secured in openings defined for this purpose in said armature.

16. The clutch according to claim 15 wherein said teeth on said first hub project axially toward said teeth on said armature, and wherein said teeth are defined in annular rings secured to said armature and to said first hub respectively.

17. The clutch according to claim 15 wherein said second hub is formed from a thermoplastic material and defines a radially inner cylindrical surface that forms a bearing with an external cylindrical surface of said sleeve means.

18. The clutch according to claim 15 wherein said fixed yoke comprises a generally C-shaped component having a central opening and opposed end flanges provided radially outwardly of said bobbin and coil.

19. The clutch according to claim 18 wherein said bottom comprises an annular component having axially spaced radially outwardly extending flanges, said coil being wound between said bobbin flanges, said bobbin having axially opposed end portions one of which is received in the central opening provided for it in said yoke, and said yoke further including a cover that is also provided with a central opening for receiving the other axially opposed end portion of said bobbin, said bobbin having an internal cylindrical surface defining a bearing for an external cylindrical surface of said first hub.

20. The combination according to claim 19 wherein said yoke, said cover, said first hub, and said armature are all fabricated from a paramagnetic material to provide a magnetic flux path in response to an electrical current in said coil.

21. The combination according to claim 20 wherein said armature comprises an annular component having an inner portion of approximately the radial thickness as that of said first hub, and said armature including a radially outer portion which defines said openings for receiving said end portions of said spring elements integrally formed in said first hub, said radially outer portion of said armature overlapping a portion of said paramagnetic cover.

22. The combination according to claim 21 wherein said armature is adapted for movement between an energized position where said teeth are in engagement with one another and wherein the force of said spring biasing means is overcome and a de-energized position wherein said teeth are disengaged and wherein said spring biasing means moves said armature into contact with a stop surface by said second hub.

23. The combination according to claim 22 wherein said teeth are equally spaced circumaxially in said armature and said hub, each tapered tooth having an engagement face inclined at an angle in a range of 10 to 20 degrees with respect to the axial direction.

24. The combination according to claim 23 wherein each of said teeth defines a central angle relative to the axis of rotation, and wherein the gap between adjacent teeth is in the range of three to five times that angle.

25. The combination according to claim 24 wherein said annular thermoplastic ring defining said teeth on said armature and first hub is held in place on said respective components by reason of thermoplastic projections extending radially inwardly of said ring an being received in openings provided for this purpose in said components.

* * * * *